(12) United States Patent
Davis

(10) Patent No.: US 7,946,194 B2
(45) Date of Patent: May 24, 2011

(54) CONTINUOUSLY VARIABLE COMPOUND LEVER HUMAN POWERED TRANSMISSION

(76) Inventor: Michael Owen Davis, Las Vegas, NV (US)

( * ) Notice: Subject to any disclaimer, the term of this patent is extended or adjusted under 35 U.S.C. 154(b) by 259 days.

(21) Appl. No.: 12/228,036

(22) Filed: Aug. 8, 2008

(65) Prior Publication Data

US 2010/0031770 A1 Feb. 11, 2010

(51) Int. Cl.
*B62M 3/00* (2006.01)
(52) U.S. Cl. ....................................................... 74/594.1
(58) Field of Classification Search ................ 74/579 R, 74/594.1, 594
See application file for complete search history.

(56) References Cited

U.S. PATENT DOCUMENTS

| | | |
|---|---|---|
| 449,670 A | 2/1891 | Elliott |
| 584,200 A | 6/1897 | Wheatley |
| 3,375,023 A | 3/1968 | Cox |
| 3,633,938 A | 1/1972 | Solomon et al. |
| 3,661,404 A | 5/1972 | Bossaer |
| 3,759,543 A | 9/1973 | Clark |
| 3,834,733 A | 9/1974 | Harris |
| 3,888,512 A | 6/1975 | Peterson |
| 3,954,282 A | 5/1976 | Hege |
| 3,984,129 A | 10/1976 | Hege |
| 4,077,648 A | 3/1978 | Seol |
| 4,161,328 A | 7/1979 | Efros |
| 4,227,712 A | 10/1980 | Dick |
| 4,272,096 A | 6/1981 | Efros |
| 4,300,784 A | 11/1981 | Efros |
| 4,421,334 A | 12/1983 | Efros |
| 4,574,649 A | 3/1986 | Seol |
| 4,630,839 A | 12/1986 | Seol |
| 5,335,927 A | 8/1994 | Islas |
| 6,412,802 B1 * | 7/2002 | Kugel et al. ................... 280/252 |
| 6,749,211 B1 * | 6/2004 | Yliniemi ........................ 280/254 |
| 2007/0228687 A1 | 10/2007 | Park |
| 2008/0106061 A1 | 5/2008 | Meguerditchian |

\* cited by examiner

*Primary Examiner* — Vicky A Johnson

(57) ABSTRACT

A human powered transmission for self propelled vehicles having oscillating power input levers displacing a pivoted power input member. The power input member pivotally journaled to a power output lever, the power output lever bearing on a fulcrum roller. The fulcrum rollers having a mechanism for adjusting the fulcrum roller along a predetermined length of the power output lever. Power output lever having a power output pivot, the power output pivot is connected to a flexible member for transferring tensile force to a unidirectional torque converter.

16 Claims, 3 Drawing Sheets

Figure 1:
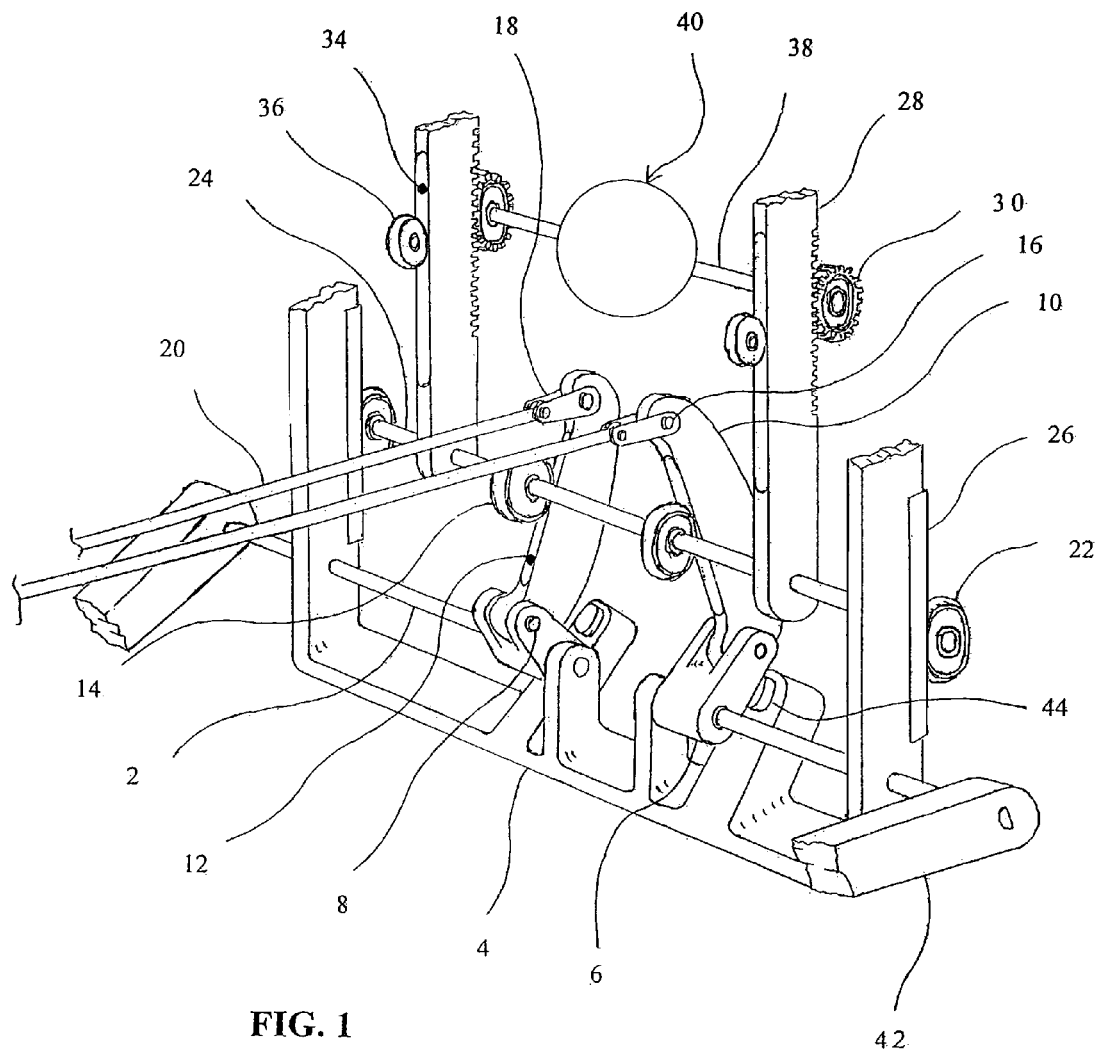

FIG. 5
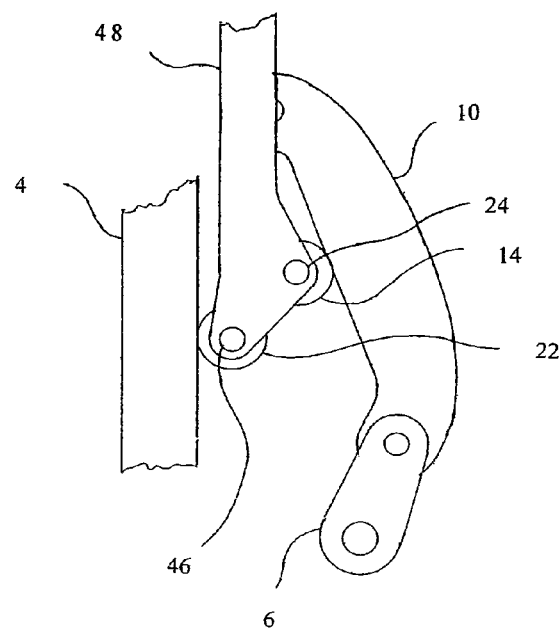
FIG. 6
Torque Comparison Graph
Scale X    Pound force output
Scale Y    Foot pedal location
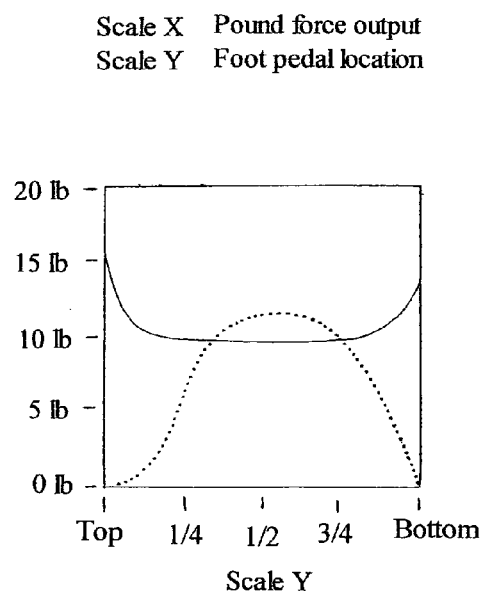
Solid Line = Oscillating Pedal
Dotted Line = Rotating Pedal
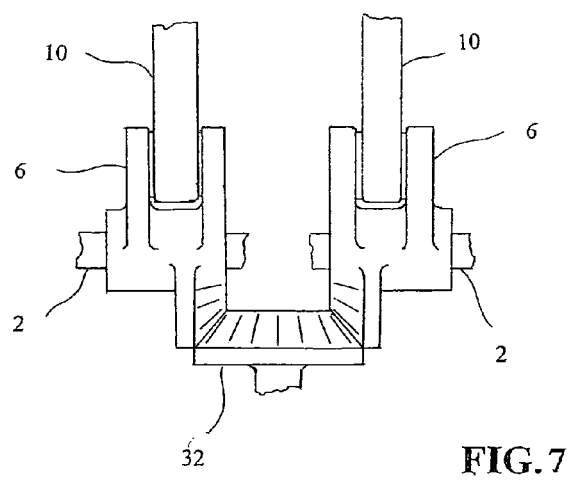
FIG. 7

CONTINUOUSLY VARIABLE COMPOUND LEVER HUMAN POWERED TRANSMISSION

FIELD OF INVENTION

This invention relates to a human powered transmission, specifically to such which have oscillating input levers and rotating power output supplies for vehicles such as bicycles, wheelchairs, water craft and the like.

BACKGROUND

Prior Art

Over the years many attempts have been made to overcome the inherent inefficiencies of the rotating pedal transmission system of the type used in bicycles and such. The mechanical and ergonomic problems are as follows: When the pedals are near top and bottom dead center, very little input force is transmitted to the drive train. The interrelated geometry of the human leg and the rotating pedal create an ergonomic top dead center wherein the knee of a seated rider continues to rise upward until the pedal is past mechanical top dead center by 20 degrees or more. Hence, many riders assume a standing position to minimize this problem during short periods of maximum exertion. Another problem related to top and bottom dead center is that the momentum of the bicycle needed to carry the bicycle past the dead centers and into usable range of the pedal rapidly dissipates when riding against a steep incline or high aerodynamic resistance slowing the vehicle and increasing labor. Further ergonomic problems come from a rotating pedal of a typical 6.5 inches that creates a rotation diameter of 13 inches. One is that for the leg to advance to the usable portion of the pedal cycle it must retract and lift itself well above the usable portion. Thus creating a significant loss of energy. Also the rotating pedal system brings the toe behind the knee which can be harmful to the knee and prohibit some people from using such vehicles.

The roller chain derailleur gear drive train presents problems also. Typically these systems are mounted in locations that are impractical or difficult to protect from dirt or damage thus increasing the intervals of maintenance required.

To overcome the limitations stated above, prior art has shown many attempts to take advantage of a oscillating lever type pedal system with little or no commercial or competitive success. Much of prior arts lack of success stems from the fact that oscillating pedals degree of rotation is significantly less per cycle than that of the rotating pedal system. To compensate oscillating pedal drive trains must overdrive their gear ratio at some point in their drive train. In most cases, the results lead to no mechanical advantage or advantages so minimal they don't overcome the following problems in prior art.

Prior art display's considerable size and weight in their systems contributing to poorer aerodynamic coefficients and higher roll resistance. Prior art teaches that many systems have gearshift mechanisms directly mounted on oscillating members creating greater inertia to be overcome with each pedal stroke, added resistance from linkage and greater wear and fatigue on the linkage. Also because forces are considerable on oscillating shifter mechanisms many systems will not shift easily or at all while force is being applied to their pedal levers. Plus, in prior art the geometric relationship between the shifter linkage and the primary member for receiving input force can vary to such a degree that the torque pattern of a single pedal stroke can vary erratically from high to low gears. Another common disadvantage of prior art oscillating systems is that they are not easily reconfigured for use in specialized vehicles or easily enclosed for the benefit of protection from the elements or improve aerodynamics.

The prior art disclosed in U.S. Pat. No. 3,633,938 issued to Arieh Solomon, Jecheskel Davidovitch, Ramat-Gan on Jan. 11, 1972, and U.S. Pat. No. 3,984,129 issued to Douglas W. Hege on Oct. 5, 1976 and U.S. Pat. No. 4,300,784 issued to Boris Efros on Nov. 17, 1981 are examples of prior art that had difficulty with the above stated problems there for provided no significant advantages over the rotating pedal system.

SUMMARY

In the improvement for a transmission mechanism having an oscillating power input lever or oscillating crank arm. A foot pedal or hand grip for communicating human power to the oscillating lever. A structural framework for interrelating componentry. The oscillating levers having a means for interconnecting and synchronizing one another and also a means of transmitting oscillatory force to a receptive member of the transmission. A transmission further comprising an unidirectional torque converter or freewheel mechanism of the sprag clutch or ramp and roller type. The freewheel mechanism further comprising of a receptive member and a means of conveying tensile force from an oscillating power output supply, such as a sprocket wheel and a roller chain. Where return tension may be exerted on the oscillating roller chain or a like member using a bias spring mechanism and rotational power output is provided by a rotating element coaxially mounted in said freewheel mechanism.

The improvement wherein the displacement from the power input levers is communicated to a power input shaft. Keyed to the power input shaft is an oscillating power input member. The power input member having a secondary pivot that oscillates on an arc parallel to the axis of the power input axis. To this secondary pivot is connected a power output lever. The power output lever bears upon a fulcrum roller. On the power output level at the end opposite of the secondary pivot is a power output pivot. The fulcrum rollers having a means of adjustment for moving the fulcrums along a predetermined length of the power output lever on a surface that runs substantially between the secondary pivot and the power output pivot. The power output pivot is connected to the means of conveying tensile force to the freewheel mechanism. The fulcrum rollers and fulcrum guides are coaxially mounted on a fulcrum control shaft. The fulcrum control shaft being mounted on rack gear members. Controlling the position of the rack gear members are pinion gears that are mounted on a pinion gear control shaft. The pinion gear control shaft having a shifter control mechanism.

This transmission system is well suited for a broad range of vehicles and equipment such as wheelchairs, watercraft, bicycles, tricycles, self propelled carts and the like. This transmission system can be configured in many ways. With componentry compactly grouped for protective and aerodynamic enclosure or widely dispersed about the structural frameworks as needed. The embodiment above is a general example of a common configuration requirements.

BRIEF DESCRIPTION OF THIS DRAWING

Figure 2:
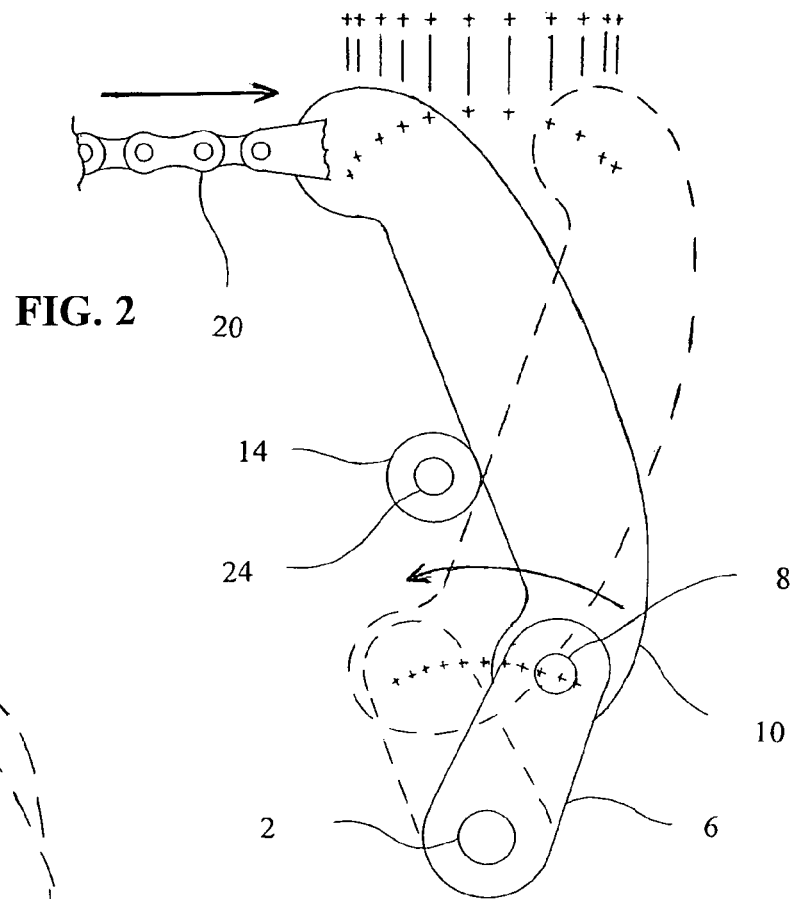
Figure 3:
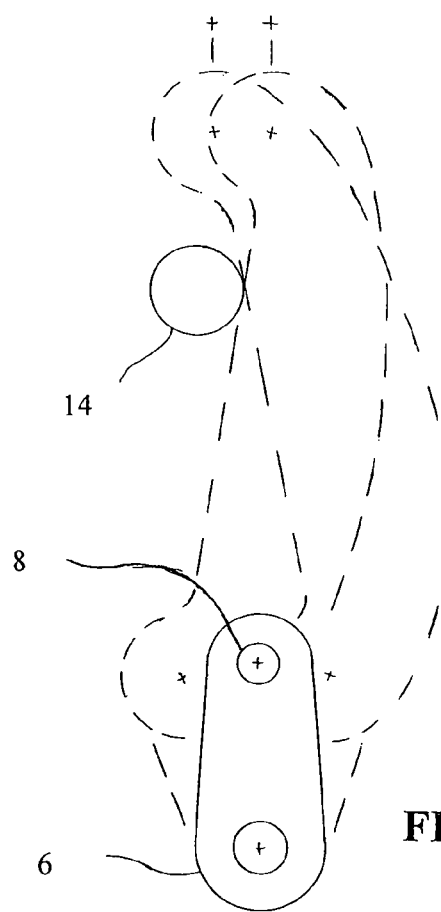
Figure 4:
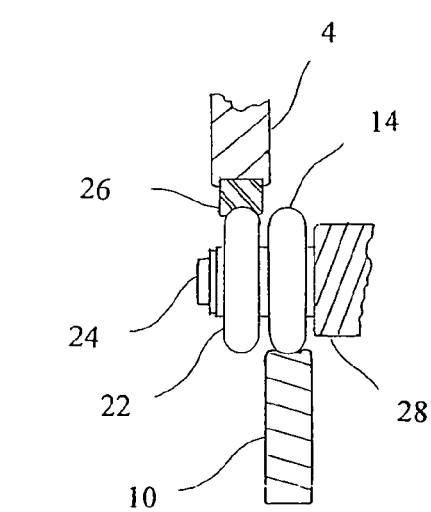

FIG. 1 is a schematic view of transmission
FIG. 2 is a side view graph of power input lever
FIG. 3 is a side view graph of power input lever
FIG. 4 is a partial cross-sectional view of fulcrum guides
FIG. 5 side view of fulcrum guides
FIG. 6 torque curve graph
FIG. 7 front view of synchronizer gear

DETAILED DESCRIPTION OF PREFERRED EMBODIMENT

This embodiment for a human powered transmission typifies a configuration that has a wide range of applications. Numerous alternative configurations and layouts are also possible to meet many other demands.

In FIG. 1 a left and a right power input shaft 2 are journaled to the structural framework 4 supported by self aligning fabric coated plain bearings at both ends. The fabric coating being Teflon or a Teflon/Nomex mix.

The outboard end of the power input shaft 2 having a notched, keyed or serrated surface or the like for reception of oscillating displacement. Power input shaft 2 having a keyway in the central section for securing a power input member 6. Power input member being axially located between the plain bearings by means of fabric coated bushing washers. Parallel to power input shaft 2 in the power input member 6 is a secondary pivot 8 snap ringed to said input member. On the secondary pivot 8 a power output lever 10 is journaled, the axial and radial loads being born by a fabric coated journal bearing and bushing washer. Power output lever 10 being of bearing quality steel, the lever having a linear concave fulcrum guide 12 disposed against a fulcrum roller 14. The fulcrum guide 12 being heat treated to a bearing hardness. Power output lever 10 having a power output pivot 16 at end opposite the secondary pivot 8. The power output pivot being snap ringed to power output lever 10. Journaled to the power output lever 10 via power output pivot 16 is a master link 18. A fabric coated journal bearing and bushing washer are also being used at this location. The master link 18 is connected to a roller chain 20 which interlinks the power output lever 10 to a unidirectional torque converter means. Fulcrum rollers 14 and fulcrum roller guides 22 are mounted coaxially on a fulcrum control shaft 24. The fulcrum rollers and fulcrum roller guide being mounted on the control shaft using fabric coated journal bearings, bushings, bushing washers and snap rings.

The fulcrum rollers 14 and fulcrum roller guides 22 being composed of bearing quality steel and heat treated to bearing hardness. The fulcrum rollers and fulcrum roller guides having convex outer surfaces. The fulcrum roller guides 22 bear upon fulcrum roller tracks 26, which have linear concave surfaces on which fulcrum roller guides 22 bear. The fulcrum guide tracks being heat treated to bearing hardness. The fulcrum guide track being machine screwed to framework 4.

Positioned between each fulcrum roller 14 and fulcrum roller guide 22 is a rack gear member 28 fastened to the fulcrum control shaft 24. Operating on the rack gear members 28 are pinion gears 30. The junction of the pinion gears and the rack gear members are on a plane that radiates substantially from the mean angle of the arc of the secondary pivot as seen in FIG. 3. The rack gear member 28 FIG. 1 having a linear concave rack gear guide track 34 opposite pinion gears. A rack gear guide roller 36 is framework 4 mounted and placed in opposition to the pinion gear 30 in the rack gear guide track.

Interconnecting and controlling the pinion gears 30 is a pinion gear shaft 38. The pinion gear shaft is connected to a pinion shaft control means 40 that limits and controls the rotation of the pinion gear shaft 38.

Operation

In FIG. 1 the power input shaft 2 receives oscillating displacement from a power input lever 42 and transmits it to the power input member 6. Power input members secondary pivot 8 transmits the displacement to power output lever 10. Power output lever 10 oscillates upon fulcrum roller 14. The oscillatory displacement of power output pivot 16 is conveyed to a freewheel assembly via master link 18 and roller chain 20. Fulcrum roller guide 22 bear the force on the fulcrum control shaft 24 and transmits it to the structural framework 4.

The fulcrum roller track 26 controls the axial movement of fulcrum control shaft 24. The fulcrum rollers 14 placement along the fulcrum guide 12 of the power of output lever 10 controls the overall output displacement or the overall torque output the power output pivot 16. The rack gear members 28 controls the movement of the fulcrum rollers 14, the pinion gears 30 transfers the control commands from the pinion gear shaft 38 to the rack gear member 28, the pinion shaft control means 40 selects and controls the overall torque output of the transmission.

The interacting geometry of the power input member, the power output lever and the fulcrum roller and the receptive member of the freewheel create significant mechanical advantages. The above being in aggregate a compound lever producing a powerful torque pattern that is inherently flat across the center part of the power stroke and spiking upwardly at the beginning and end of each stroke. To illustrate this point, in low gear and fitted to a bicycle, this transmission produces more pounds of thrust at the rear wheel at the ground than the pounds of force being applied to the pedal at its top, beginning position.

As said above, being in nature a compound lever system, the radial loads on the fulcrum rollers and alternating thrust loads on the shifting means can be considerable. The fulcrum rollers and fulcrum roller guides make use of this thrust to become a self powered shifting mechanism when released to move in a chosen direction.

Additional Embodiments

As stated, the adaptability of this transmission system lends itself to many optional embodiments. Such as when the power input members 6 are mounted on a common input shaft axis. The mechanism for interconnecting and synchronizing the power input levers 42 may be located at the power input members 6. With the power input members having mirrored right angle gears and synchronizer gear 32 interposed between as seen in FIG. 7. Stops for limiting power input levers travel may be located at many points throughout this system. One such location is a stop 44 or snubber as seen in FIG. 1 positioned between power input member and frame 4. Limiting stop 44 maybe a resilient solid stop, adjustable or spring loaded or a combination of the above. The rack gear member 28 and pinion gears 30 may be of a single nature or a plurality. Seen in FIG. 5 is a fulcrum roller guide 22 which is mounted on a secondary fulcrum control shaft 46 that is parallel to the fulcrum control shaft 24. Both shafts being fastened to dual control shaft rack gear member 48. In FIG. 4 a cross section is seen of the fulcrum roller 14, power output lever 10, fulcrum roller guide 22 and fulcrum roller track 26. The concave, convex relationship of the above parts may be reversed. Also many other contours may be employed such as flat guide surfaces and flanged roller profiles. Larger vehicles such as recreational watercraft or vehicles with exposed componentry may benefit from power input levers, such as a foot pedal or hand lever that connect to the power input lever being of one continuous fabrication. Or as seen in FIG. 1 power input lever 42 may be connected to power input member 6 via a power input: shaft 2. Also the mechanism for synchronizing the power input levers may be omitted and spring returns used, allowing independent pedal use. The various groups of componentry may be mount in or on their own structural members or disposed about the structural framework of its host vehicle as desired. The pinion shaft control means 40 may be comprised of a reduction gear driven by an electric motor, a cog wheel and pawls or solid linkage or the like thus controlling pinion gear shaft rotation. As seen above, this transmission system's adaptability lends itself to a broad range of manifestations.

Advantages

This transmission system has many ergonomic advantages over conventional rotating systems. When powered by the human leg, the total amount of elevation the leg must lift itself from the end of one stroke to the top of the next is about 27% less. Thus reducing total retraction at the knee by about 15 degrees. The geometry of the system accelerates the leg out of its most retracted state and in so doing allows the leg to spend a greater percentage of the elapse time of a pedal stroke in a more powerful extended state. And further by balancing the geometry of the power input lever's pivot point, length and degrees of oscillation the relationship of ergonomics and mechanics can be improved.

Another important inherent feature in the geometry of this system is that the gear ratio or leverage is shifted on a secondary lever and fulcrum and not on the primary lever. This has the advantage of a higher primary torque input into the gear system which reduces the effects of compound torque loss, particularly in the higher gear ranges. This is a desirable advantage when compared to a rotating pedal system with is front sprockets or prior arts oscillating pedals with shift points directly connected to a primary lever. Seen in FIG. 2 the fulcrum roller 14 is positioned against a power output lever at a location producing a greater amount of displacement which represents a high gear ratio. The arc of intersections in the lower part of FIG. 2 represents equal degrees of input displacement. The arc of intersections near the top of the figure represents the response of the power output pivot 16 to the interaction of the fulcrum roller 14. The horizontal line of intersections represents the corresponding amount of the roller chains displacement on the receptive member of the unidirectional torque converter. An advantage is seen in that the effective gear ratio is much lower at the beginning and end of a pedal stroke thus offsetting the disadvantages of the interaction of the leg at its weakest position with the pedal. As seen in FIG. 3 the fulcrum roller is positioned to generate minimal displacement of the power output pivot or in effect being in low gear.

Another advantage is that the input displacement may be tailored to create torque output curves for a great variety of applications. This geometry also creates torque output curves that are very similar from high to low gear. A comparison of torque curves is seen in FIG. 6, the solid line being that of this invention and the dotted line being a conventional rotating pedal.

As seen in the above, there are many ways to configure this human powered transmission. These descriptions should not be taken as limiting in nature or the sole embodiments but as an indication of the spirit and scope of the transmission.

The invention claimed is:

1. A human powered transmission mechanism having a structural framework, a left and a right power input lever, said power input levers each having a means of receiving oscillatory displacement, each said power input lever being fastened to a power input shaft each said power input shaft being journaled to said structural framework, to each said power input shaft a power input member is fastened, to each said power input member a power output lever is pivotally fastened, each said power output lever bearing upon a fulcrum roller, the transmission having a means of adjusting the fulcrum rollers position along a predetermined length of each said power output lever, each said power output lever having a power output pivot at the end that is substantially opposite the end of the pivotal connection to said power input member.

2. The transmission mechanism of claim 1 wherein said power input members pivot upon a common power input axis.

3. The transmission mechanism of claim 1 wherein said power input members angular displacement is controlled by a limiting means interposed between said power input members and said structural framework.

4. The transmission mechanism of claim 1 wherein said power input members directly actuate said means of connecting and synchronizing said power input levers.

5. The transmission mechanism of claim 1 wherein said power input levers are rigidly connected to said power input members.

6. The transmission mechanism of claim 1 wherein each said power input lever and each said power input member are keyed to said power input shafts.

7. The transmission mechanism of claim 1 wherein said means of adjusting the fulcrum rollers position is supported by fulcrum roller guides, said fulcrum roller guides and said fulcrum rollers journaled on a common axis to said means of adjusting the fulcrum rollers position, said fulcrum roller guides each travel upon fulcnun guide tracks, said fulcrum guide tracks being supported by said structural framework.

8. The transmission mechanism of claim 1 wherein said means of adjusting the fulcrum rollers position is supported by fulcrum roller guides that are journaled on an axis parallel to said fulcrum rollers.

9. The transmission mechanism of claim 1 wherein each said power output lever has a linear concave surface along which said fulcrum rollers travel.

10. The transmission mechanism of claim 1 wherein said fulcrum rollers outer surface is convex.

11. The transmission mechanism of claim 1 wherein said means of adjusting the fulcrum rollers position is supported by fulcrum roller guides, said fulcrum rollers guides having a convex outer surface, said fulcrum roller guides travel on fulcrum guide tracks having a concave surface.

12. The transmission mechanism of claim 1 wherein said means of adjusting the fulcrum rollers position being a left and right rack gear member that travel substantially on a plane parallel to said fulcrum guide tracks said rack gear members having pinion gears disposed against said rack gear members.

13. The rack gear members of claim 12 having a rack gear guide roller opposite each said pinion gear.

14. A human powered transmission mechanism having a structural framework, a left and a right power input lever, each said power input lever having a means of receiving oscillatory displacement, each said power input lever being connected to a power input shaft upon which said power input levers oscillate, each said power input shaft being journaled to said structural framework, to each said power input shaft a power input member is secured there by communicating oscillatory displacement to each said power input member, each said power input member having a secondary pivot to which a power output lever is connected there by communicating oscillatory displacement to each said power output lever, each said power output lever is disposed against a fulcrum roller upon which each said power output lever oscillates in a rocking motion, the transmission having a means of adjusting the fulcrum rollers position anywhere along a predetermined length of each said power output lever there by varying the leverage of both said power input levers, each said power output lever having at the ends away from said secondary pivot a connection to a means of conveying oscillatory tensile force from the transmission.

15. The transmission mechanism of claim 14 wherein each said secondary pivot axis is parallel to the power input shaft axis.

16. The transmission mechanism of claim 14 wherein said means of adjusting fulcrum rollers position travels on a plane substantially the same as that of the mean angle of the oscillatory arc of said power input members.

\* \* \* \* \*